(12) United States Patent
Kataoka et al.

(10) Patent No.: US 11,731,502 B2
(45) Date of Patent: Aug. 22, 2023

(54) INTERNAL COMBUSTION ENGINE

(71) Applicant: HONDA MOTOR CO., LTD., Tokyo (JP)

(72) Inventors: Dai Kataoka, Tokyo (JP); Wataru Nagata, Tokyo (JP); Masashi Furuya, Tokyo (JP); Yuichi Tawarada, Tokyo (JP); Teruo Kihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/695,924

(22) Filed: Mar. 16, 2022

(65) Prior Publication Data

US 2022/0314784 A1   Oct. 6, 2022

(30) Foreign Application Priority Data

Mar. 31, 2021   (JP) .............................. JP2021-061499

(51) Int. Cl.
*F01P 5/06* (2006.01)
*B60K 11/04* (2006.01)
(Continued)

(52) U.S. Cl.
CPC .......... *B60K 11/04* (2013.01); *B60H 1/00028* (2013.01); *B62J 17/00* (2013.01); *B62J 23/00* (2013.01); *B62K 11/04* (2013.01); *B62K 19/48* (2013.01); *B62M 7/02* (2013.01); *F01P 5/06* (2013.01); *F01P 11/10* (2013.01); *B60Y 2200/12* (2013.01)

(58) Field of Classification Search
CPC ...... F01P 5/06; F01P 11/10; F01P 1/02; F01P 1/06; B60Y 2200/12; B62K 2202/00
See application file for complete search history.

(56) References Cited

U.S. PATENT DOCUMENTS

| | | | | |
|---|---|---|---|---|
| 1,513,170 A | * | 10/1924 | Williams | F02F 1/04 123/41.85 |
| 1,644,731 A | * | 10/1927 | Kettering | F01L 1/12 123/41.31 |

(Continued)

FOREIGN PATENT DOCUMENTS

| | | |
|---|---|---|
| EP | 0342360 A2 * | 11/1989 |
| EP | 0189874 B1 * | 3/1990 |

(Continued)

OTHER PUBLICATIONS

Indian Office Action dated Oct. 12, 2022 issued in corresponding Indian application No. 202244015688; English translation included (5 pages).

(Continued)

*Primary Examiner* — Hung Q Nguyen
(74) *Attorney, Agent, or Firm* — Rankin, Hill & Clark LLP

(57) ABSTRACT

In an internal combustion engine, a gasket is disposed between joining surfaces of a cylinder block and a cylinder head, and a heat radiation rib that extends in a cylinder axis direction is formed on the cylinder block or the cylinder head. In such an internal combustion engine, the gasket includes: a portion to be sandwiched that is sandwiched between the joining surfaces; and an extending portion that protrudes toward an outside from the portion to be sandwiched as viewed in a cylinder axis direction.

8 Claims, 6 Drawing Sheets

(51) Int. Cl.
*B60H 1/00* (2006.01)
*B62J 17/00* (2020.01)
*B62J 23/00* (2006.01)
*B62K 19/48* (2006.01)
*B62M 7/02* (2006.01)
*F01P 11/10* (2006.01)
*B62K 11/04* (2006.01)

(56) References Cited

U.S. PATENT DOCUMENTS

| | | | | |
|---|---|---|---|---|
| 4,515,111 A | * | 5/1985 | Vosmeyer | F01P 1/02 |
| | | | | 123/41.69 |
| 5,105,777 A | | 4/1992 | Kronich et al. | |
| 6,240,828 B1 | | 6/2001 | Fujimoto | |
| 6,371,489 B1 | | 4/2002 | Combet et al. | |
| 2005/0109292 A1 | * | 5/2005 | Gokan | F02F 7/008 |
| | | | | 123/41.69 |

FOREIGN PATENT DOCUMENTS

| | | | | | |
|---|---|---|---|---|---|
| EP | 2314852 | A1 | | 4/2011 | |
| EP | 2580458 | B1 | * | 10/2014 | ............ F02G 1/02 |
| JP | S54-161405 | U | | 11/1979 | |
| JP | S58-117335 | A | | 7/1983 | |
| JP | H1-277664 | A | | 11/1989 | |
| JP | H0630454 | U | * | 4/1994 | |
| JP | H1054296 | A | * | 2/1998 | |
| JP | 2009-235930 | A | | 10/2009 | |
| JP | 2011127448 | A | * | 6/2011 | |
| JP | 2019-043204 | A | | 3/2019 | |

OTHER PUBLICATIONS

Japanese Office Action corresponding to Application No. 2021061499 A, dated Feb. 21, 2023, 9 pages.

* cited by examiner

INTERNAL COMBUSTION ENGINE

INCORPORATION BY REFERENCE

The present application claims priority under 35 U.S.C. § 119 to Japanese Patent Application No. 2021-061499 filed on Mar. 31, 2021. The content of the application is incorporated herein by reference in its entirety.

TECHNICAL FIELD

The present invention relates to an internal combustion engine.

BACKGROUND ART

Conventionally, there has been known an internal combustion engine where a gasket is disposed between joining surfaces of a cylinder block and a cylinder head, and heat radiation ribs that extend in a cylinder axis direction are formed on the cylinder block or the cylinder head (for example, see patent literature 1).

CITATION LIST

Patent Literature

[patent literature 1] JP-A No. 2019-43204

SUMMARY OF INVENTION

Technical Problem

However, in the above-mentioned internal combustion engine, in a case where the cylinder block and the cylinder head are cooled by forced air cooling, for example, a temperature in a combustion chamber of the cylinder head becomes a high temperature and hence, there exists a drawback that the cylinder head and the cylinder block cannot be cooled sufficiently.

The present invention has been made in view of the above-mentioned circumstances, and it is an object of the present invention to provide an internal combustion engine that can suppress the elevation of a temperature in a combustion chamber of a cylinder head.

Solution To Problem

An aspect of the present invention provides an internal combustion engine where a gasket is disposed between joining surfaces of a cylinder block and a cylinder head, and a heat radiation rib that extends in a cylinder axis direction is formed on the cylinder block or the cylinder head, the gasket includes: a portion to be sandwiched that is sandwiched between the joining surfaces; and an extending portion that protrudes toward an outside from the portion to be sandwiched as viewed in a cylinder axis direction.

Advantageous Effects Of Invention

According to the aspect of the present invention, the gasket includes the extending portion that protrudes toward the outside from the portion to be sandwiched as viewed in the cylinder axis direction. Accordingly, the extending portion is easily exposed to outside air and hence, the elevation of a temperature in a combustion chamber of the cylinder head can be suppressed.

DESCRIPTION OF EMBODIMENTS

The following describes an embodiment of the present invention with reference to the drawings. Note that, in the description, descriptions on directions such as front and rear, right and left, and upper and lower are identical to directions with respect to a vehicle body insofar as descriptions are not particularly given. Reference sign FR illustrated in each drawing indicates a front side of the vehicle body, reference sign UP indicates an upper side of the vehicle body, and reference sign LH indicates a left side of the vehicle body.

Embodiment

Figure 1:
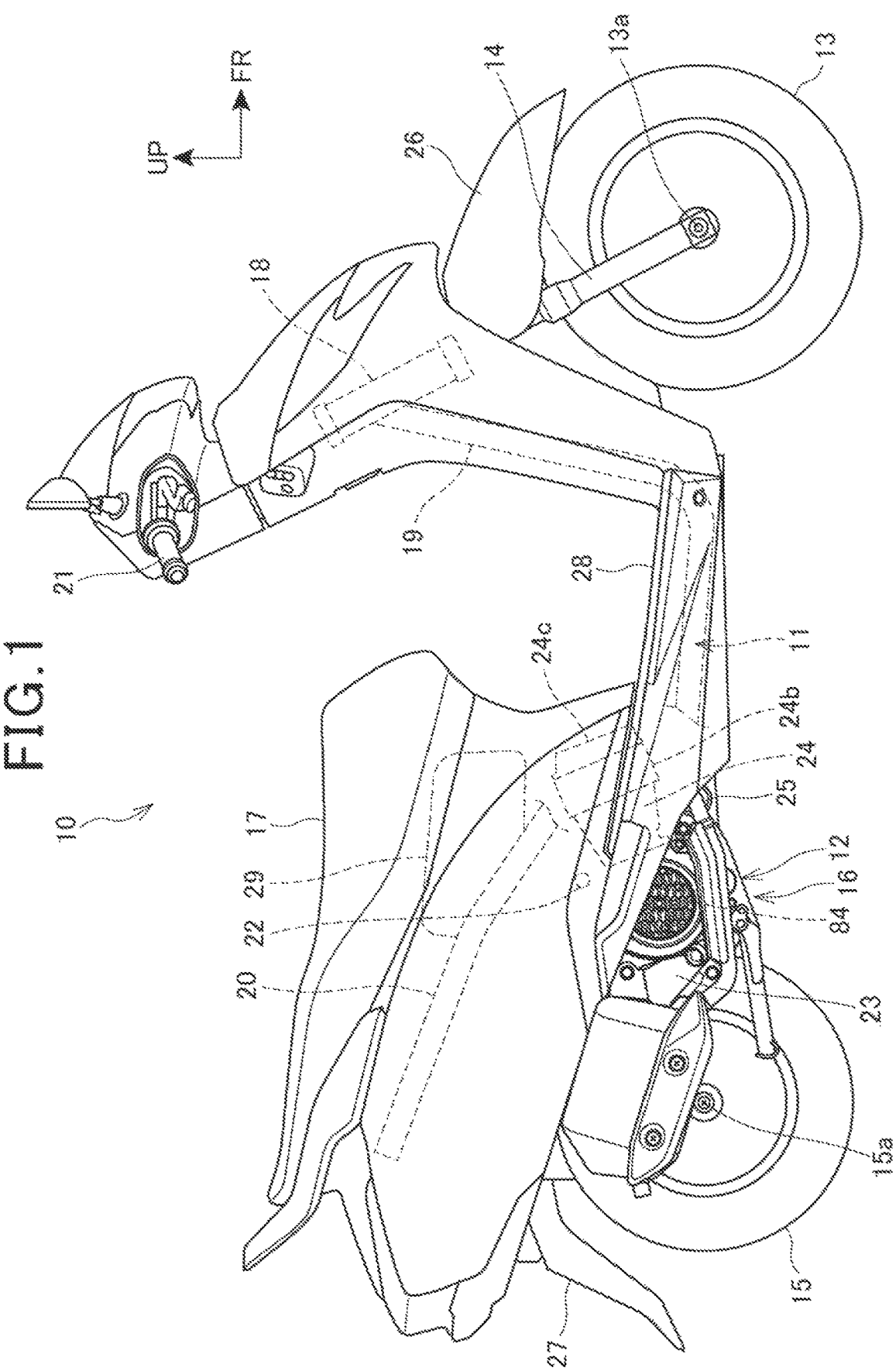
FIG. 1 is a right side view of a saddle riding vehicle according to an embodiment of the present invention.

FIG. 1 is a side view of a saddle riding vehicle 10 according to the embodiment of the present invention.

The saddle riding vehicle 10 is a vehicle including a body frame 11, a power unit 12 supported by the body frame 11, a front fork 14 that steerably supports a front wheel 13, a swing arm 16 that supports a rear wheel 15, and a seat 17 for an occupant.

The saddle riding vehicle 10 is the vehicle on which the occupant straddles the seat 17 to ride. The seat 17 is disposed above a rear portion of the body frame 11.

The body frame 11 includes a head pipe 18 disposed at a front end portion of the body frame 11, a front frame 19 positioned at a rear of the head pipe 18, and a rear frame 20 positioned at a rear of the front frame 19. A front end portion of the front frame 19 is connected to the head pipe 18.

The seat 17 is supported by the rear frame 20.

The front fork 14 is supported by the head pipe 18 so as to be freely steerable in the right and left direction. The front wheel 13 is supported by an axle 13a disposed at a lower end portion of the front fork 14. A handlebar 21 for steering, which is gripped by the occupant, is mounted to an upper end portion of the front fork 14.

The swing arm 16 is supported by a pivot shaft 22 that is supported by the body frame 11. The pivot shaft 22 is a shaft that extends horizontally in a vehicle width direction. The pivot shaft 22 is inserted through a front end portion of the swing arm 16. The swing arm 16 swings in a vertical direction around the pivot shaft 22.

The rear wheel 15 is supported by an axle 15a disposed at a rear end portion of the swing arm 16.

The power unit 12 is arranged between the front wheel 13 and the rear wheel 15, and supported by the body frame 11.

The power unit 12 is an internal combustion engine. The power unit 12 includes a crankcase 23 and a cylinder portion 24 that houses a reciprocating piston. The cylinder portion 24 has an exhaust port to which an exhaust device 25 is connected.

An output from the power unit 12 is transmitted to the rear wheel 15 by a driving force transmitting member that connects the power unit 12 to the rear wheel 15.

The saddle riding vehicle 10 includes a front fender 26 that covers the front wheel 13 from above, a rear fender 27 that covers the rear wheel 15 from above, steps 28 on which the occupant places one's feet, and a fuel tank 29 to store fuel to be used by the power unit 12.

The front fender 26 is mounted to the front fork 14. The rear fender 27 and the steps 28 are disposed below the seat 17. The fuel tank 29 is supported by the body frame 11.

Figure 2:
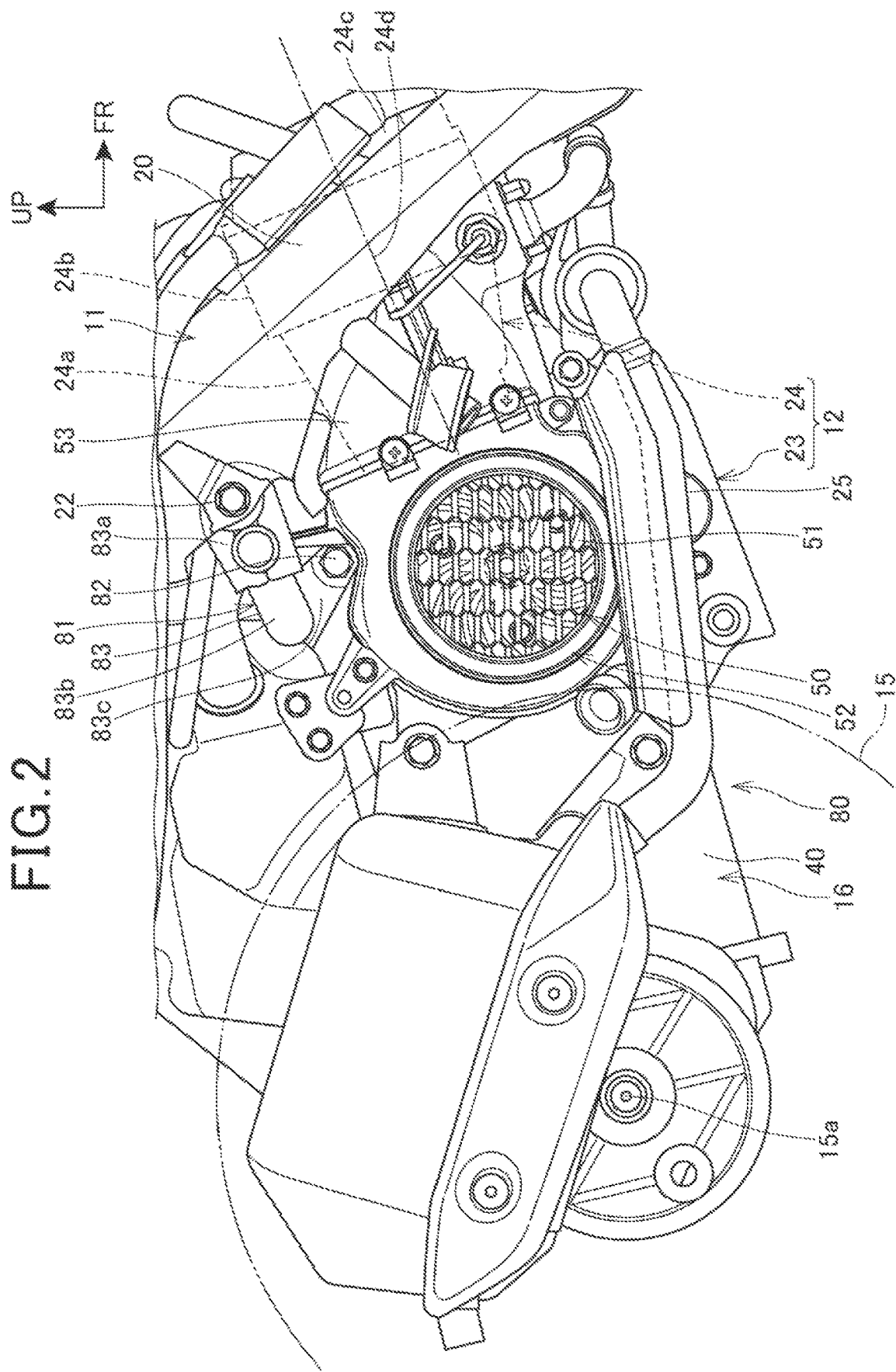
FIG. 2 is an enlarged right side view of a rear portion of the saddle riding vehicle.

FIG. 2 is an enlarged right side view of a rear portion of the saddle riding vehicle 10.

In this embodiment, the power unit 12 that is the internal combustion engine, and the swing arm 16 that supports the rear wheel 3 are integrally formed with each other (such an integral body is also referred to as a power unit arm 80).

The power unit 12 includes a cylinder portion 24 that is continuously formed with a crankcase 23. The cylinder portion 24 includes a cylinder block 24a, a cylinder head 24b, and a cylinder head cover 24c.

The vehicle body frame 11 includes a pair of left and right rear frames 20 that extend upward toward the rear in front of the crankcase 23.

The cylinder portion 24 is positioned between the rear frames 20.

The power unit arm 80 is swingably supported by the rear frame 20 by way of a link mechanism 81. The link mechanism 81 includes: a swing shaft 82 that is connected to an upper portion of the crankcase 23; a pair of left and right pivot shafts 22 that are connected to upper portions of the left and right rear frames 20; and a link member 83 that connects the swing shaft 82 and the pivot shafts 22 to each other.

The link member 83 includes: a pair of left and right first pivot portions 83a that are connected to the rear frame 20 by way of the pivot shaft 22; a lateral connecting portion 83b having a rod shape that connects the first pivot portions 83a in a vehicle width direction; and a second pivot portion 83c that extends downward from an intermediate portion of the lateral connecting portion 83b in a vehicle width direction and is connected to the swing arm 82.

The power unit arm 80 is swingable about the swing shaft 82 and the pivot shaft 22.

Figure 3:
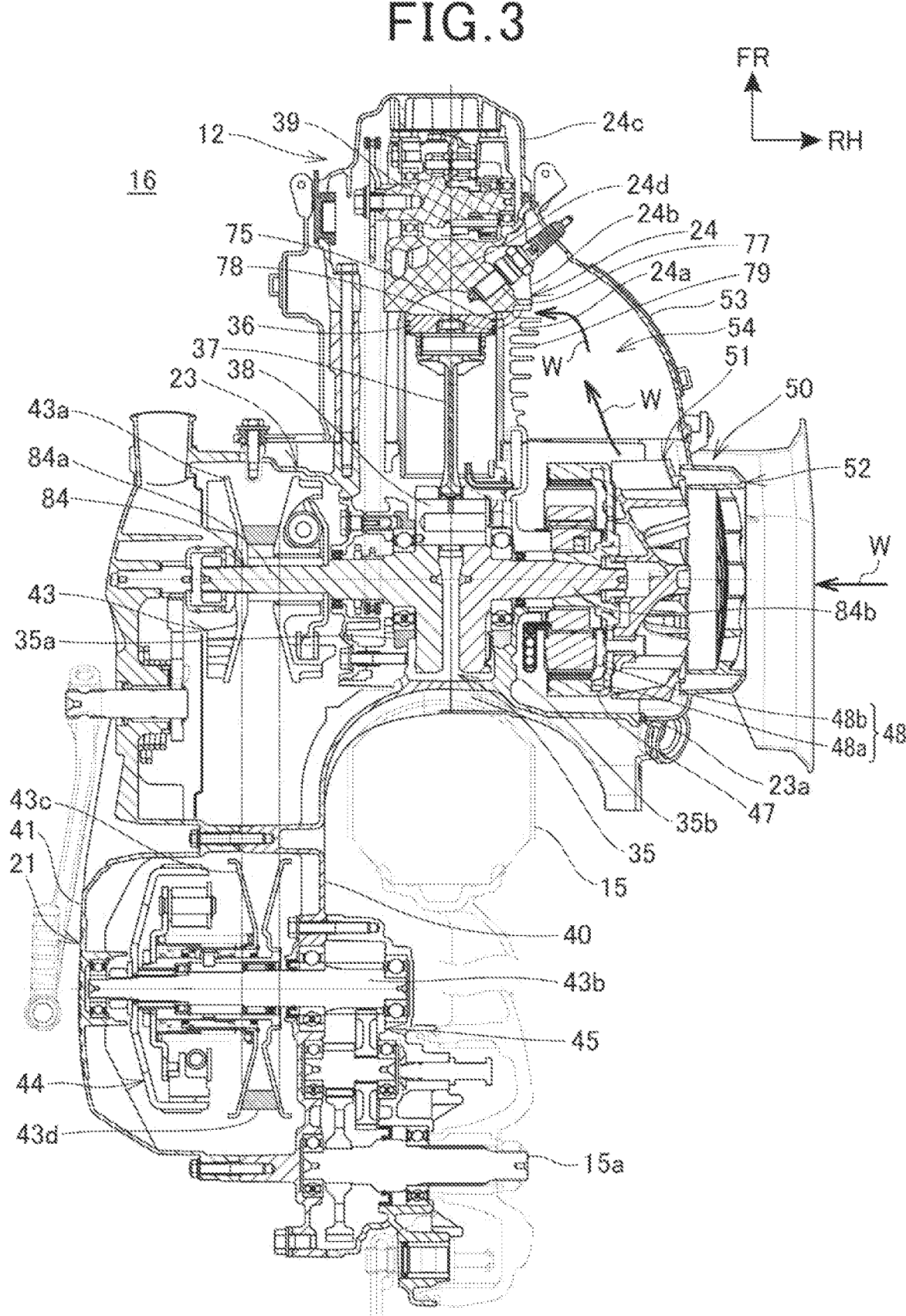
FIG. 3 is a cross-sectional view of a power unit arm.

FIG. 3 is a cross-sectional view of the power unit arm 80.

The crankcase 23 includes a crank chamber 35 that houses a crankshaft 84. The crank chamber 35 includes support walls 35a, 35b disposed orthogonal to the crankshaft 84.

The crankshaft 84 is supported by the support walls 35a, 35b by way of bearings.

A piston 36 reciprocates in the cylinder block 24a in an axial direction of a cylinder axis 24d. The piston 36 is connected to the crankshaft 84 by way of a connecting rod 37 and a crank pin 38.

A valve gear is mounted on the cylinder head 24b. A cam shaft 39 of the valve gear is disposed parallel to the crankshaft 84.

A gasket 75 is interposed between the cylinder block 24a and the cylinder head 24b. A radially directional rib 77 is formed on an outer surface of the cylinder head 24b in a state where the radially directional rib 77 extends parallel to the gasket 75. On surface of the radially directional rib 77 that faces the gasket 75, a plurality of heat radiation ribs 78 extending in a cylinder axis 24d direction are formed. Cooling fins 79 are formed on an outer surface of the cylinder block 24a.

A transmission case portion 40 is integrally formed with the crankcase 23, the transmission case portion 40 extends rearward on a left side of the crank chamber 35. The transmission case portion 40 extends to a left side of the rear wheel 3. An opening portion formed on an outer side surface of the transmission case portion 40 is closed by a case cover 41.

The swing arm 16 of the power unit arm 80 is formed of the transmission case portion 40 and the case cover 41. In the swing arm 16, a transmission mechanism 43 that transmits power to the rear wheel 3 side while changing a speed of the rotation of the crankshaft 84, a centrifugal clutch mechanism 44, and a deceleration mechanism 45 that is formed of a plurality of gears are disposed.

A drive force of the crankshaft 84 is transmitted to a rear wheel axle 3a by way of the transmission mechanism 43, the clutch mechanism 44 and the deceleration mechanism 45.

One end portion 84a of the crankshaft 84 penetrates the support wall 35a on a left side, and is positioned in the swing arm 16.

The transmission mechanism 43 is a belt type continuously variable transmission.

The transmission mechanism 43 includes: a drive pulley 43a mounted on one end portion 84a, an output shaft 43b mounted on a rear portion of the swing arm 16, a driven pulley 43c supported on the output shaft 43b, and a V belt 43d that connects the drive pulley 43a and the driven pulley 43c.

The clutch mechanism 44 is mounted on the output shaft 43b. The output shaft 43b is connected to an axle 15a by way of the deceleration mechanism 45.

The other end portion 84b of the crankshaft 84 penetrates the support wall 35b on a right side, and extends toward the outside of the crankcase 23. To the other end portion 84b of the crankshaft 84, a flywheel 47 which rotates integrally with the crankshaft 84 is fixed.

Inside of the flywheel 47, a generator 48 that generates electricity by the rotation of the crankshaft 84 is disposed. The generator 48 includes: magnets 48a that are fixed to an inner periphery of the flywheel 47; and a coil 48b disposed on a radially inner side of the flywheel 47 with respect to the magnets 48a. The coil 48b is fixed to the crankcase 23.

The power unit arm 80 includes an air supply device 50 for cooling the power unit 12 by air. The air supply device 50 includes: the crankshaft 84; a fan 51 that is fixed to the crankshaft 84 and integrally rotates with the crankshaft 84; a fan cover 52 that covers the fan 51 from the outside; and a cylinder portion cover 53 that covers the cylinder portion 24. The cylinder portion cover 53 covers the cylinder block 24a and the cylinder head 24b over substantially the entire circumference.

A space formed between the cylinder portion cover 53 and the cylinder portion 24 forms an air passage 54 through which an air flow supplied by the fan 51 passes.

In the air passage 54, the cooling fins 79 are formed on an outer surface of the cylinder block 24a. The fan cover 52 is mounted on an outer side surface portion 23a of the crankcase 23. The fan cover 52 covers an outer side surface portion 23a and the fan 51 from the outside in the vehicle width direction.

A front edge portion of the fan cover 52 is connected to a rear edge portion of the cylinder portion cover 53, and a space inside of the fan cover 52 communicates with the air passage 54.

The fan 51 is fixed to a shaft end portion of the crankshaft 84 by way of the flywheel 47. The fan 51 rotates integrally with the crankshaft 84, sucks air from the outside through the fan cover 52, and blows off the sucked air toward the outside of the fan 51 in the radial direction. An air flow that the fan 51 blows off passes through the air passage 54, reaches a periphery of the cylinder block 24a and a periphery of the cylinder head 24b, and cools the cylinder block 24a and the cylinder head 24b. The power unit 12 is forcibly cooled by air supplied from the fan 51.

The air flow that passes through the air passage 54 is discharged to the outside from a discharge port (not shown in the drawing) formed in the cylinder portion cover 53.

Figure 4:
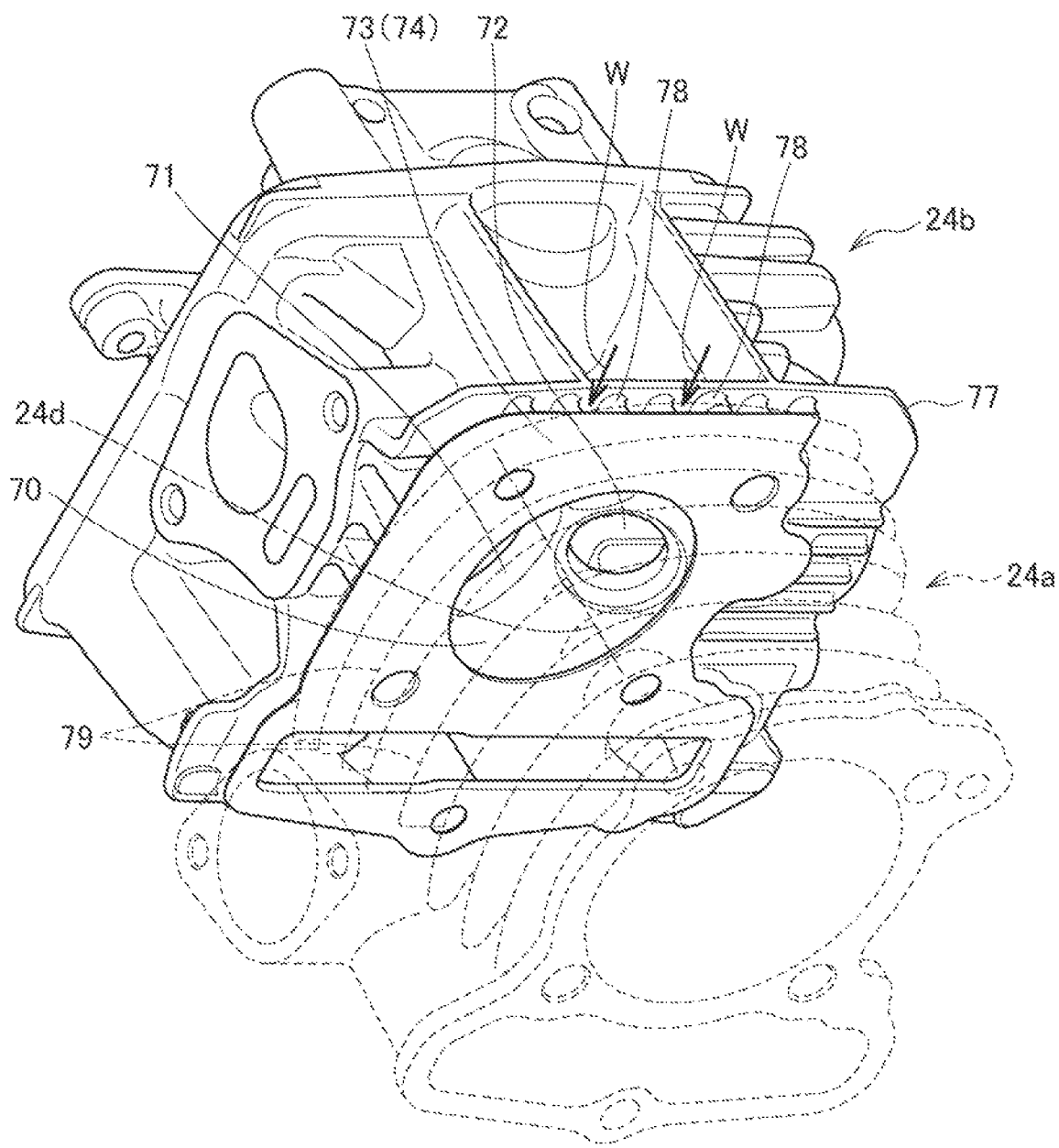
FIG. 4 is a perspective view of a cylinder block and a cylinder head.
Figure 5:
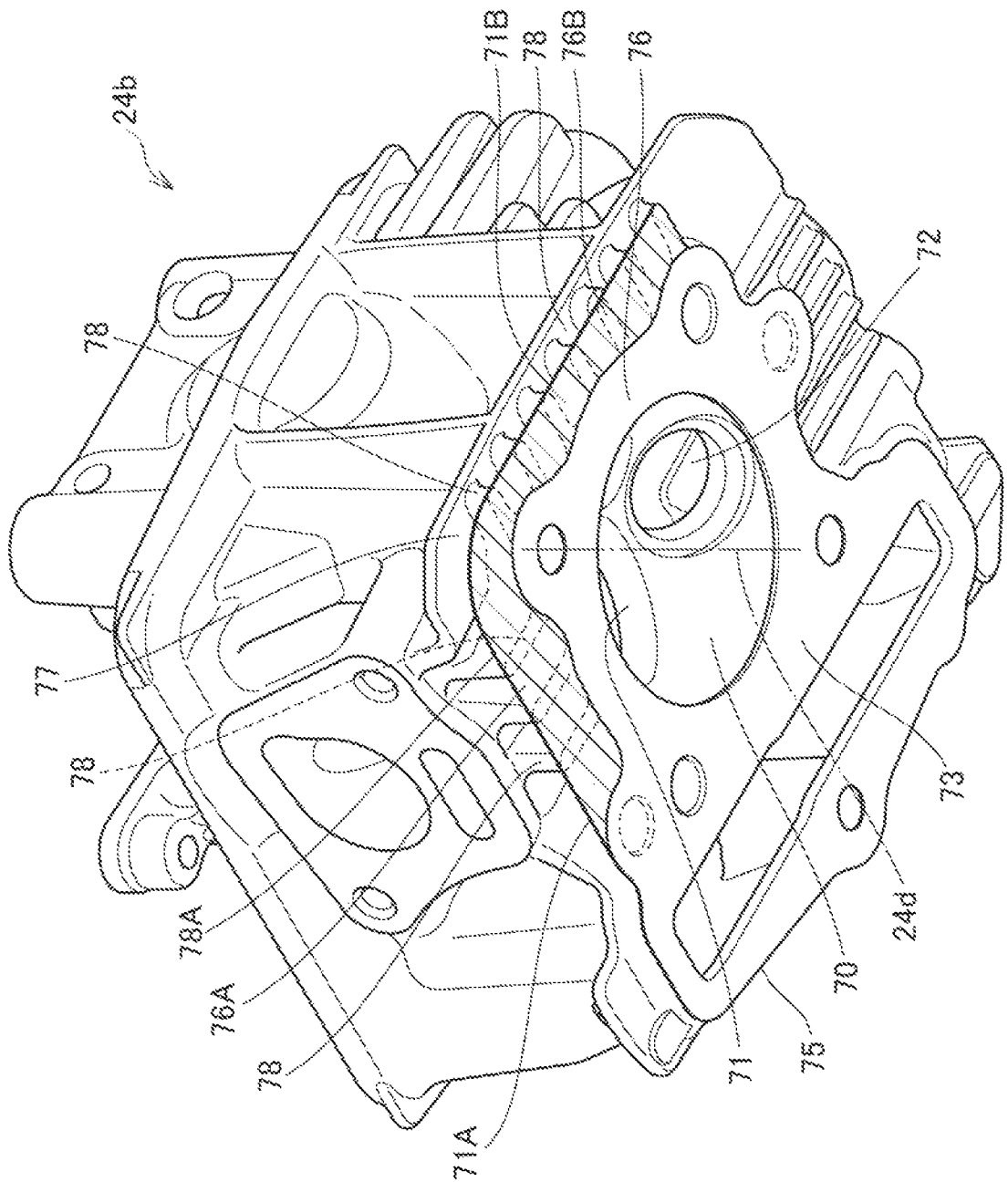
FIG. 5 is a perspective view of the cylinder head.
Figure 6:
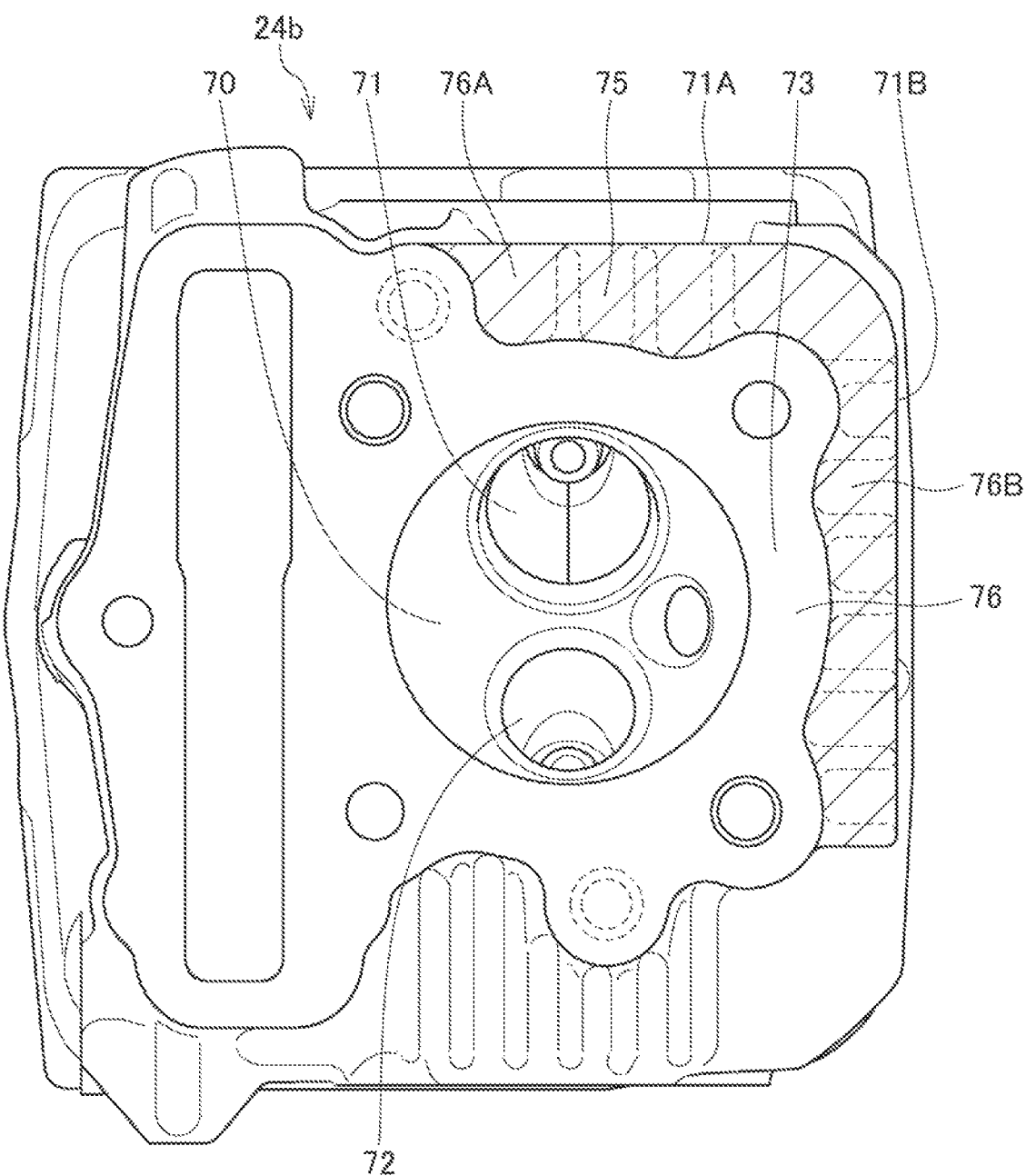
FIG. 6 is a plan view showing a joining surface of the cylinder head.

FIG. 4 is a perspective view of the cylinder block 24a and the cylinder head 24b, FIG. 5 is a perspective view of the cylinder head 24b, and FIG. 6 is a plan view showing a joining surface of the cylinder head 24b.

As shown in FIG. 4, on an outer peripheral surface of the cylinder block 24a, a plurality of cooling fins 79 extending in a circumferential direction are formed.

A combustion chamber 70 is formed in the cylinder head 24b, and an intake port 71 and an exhaust port 72 are formed in the combustion chamber 70. An intake valve and an exhaust valve are mounted (not shown in the drawing) in the intake port 71 and the exhaust port 72 respectively.

As shown in FIG. 5 and FIG. 6, a joining surface 73 that is joined to the cylinder block 24a is formed on the cylinder head 24b.

On the other hand, as shown in FIG. 4, a joining surface 74 that is joined to the cylinder head 24b is formed on the cylinder block 24a.

The gasket 75 made of metal is sandwiched between the joining surfaces 73, 74.

The gasket 75 is made of metal having a higher specific heat than the cylinder block 24a and the cylinder head 24b.

The gasket 75 is made of an iron-based metal, and the cylinder block 24a and the cylinder head 24b are made of aluminum.

The gasket 75 made of metal is sandwiched between the joining surfaces 73, 74.

In a case the gasket 75 is made of metal having a higher specific heat than the cylinder block 24a and the cylinder head 24b, the gasket 75 contributes to cooling of the cylinder block 24a.

As shown in FIG. 5 and FIG. 6, the gasket 75 includes: a portion to be sandwiched 76 that is sandwiched between the joining surfaces 73, 74; and extending portions 76A, 76B that protrude toward the outside from the portion to be sandwiched 76 as viewed in a cylinder axis direction.

Hutching is provided to the extending portions 76A, 76B.

The extending portions 76A, 76B of the gasket 75 are disposed over two sides 71A, 71B on a side where the intake port 71 is positioned (intake side).

As shown in FIG. 4, the cylinder head 24b includes the radially directional rib 77 that extends toward the outside of the extending portions 76A, 76B of the gasket 75. The radially directional rib 77 has a flat plate shape, and is disposed adjacently to the joining surface 73.

The radially directional rib 77 extends parallel to the gasket 75. On a surface of the radially directional rib 77 that faces the gasket 75, the plurality of heat radiation ribs 78 that extend in the direction of the cylinder axis 24d are formed. The plurality of heat radiation ribs 78 and the extending portions 76A, 76B of the gasket 75 are brought into contact with each other.

The extending portions 76A, 76B extend to outer edge portions 78A of the heat radiation ribs 78 or to an area in front of the outer edge portions 78A. The extending portions 76A, 76B extend in a direction that the extending portions 76A, 76B traverse the heat radiation ribs 78. With such a configuration, traveling air of the saddle riding vehicle and air that passes through between the heat radiation ribs 78 are made to efficiently impinge on the gasket 75.

The extending portion of the gasket 75 is not limited to the configuration where the extending portion is formed on two sides 71A, 71B on an intake side. The extending portion of the gasket 75 may be extended to a side on an exhaust side. It is desirable that the extending portion that is extended toward the side on the exhaust side (not shown in the drawing) be not brought into contact with the heat radiation ribs of the cylinder head 24b on an exhaust side.

Next, the manner of operation of this embodiment is described.

With reference to FIG. 3, an air flow W generated by air supplied from the air supply device 50 is described.

When the fan 51 integrally rotates with the crankshaft 84, air that is present outside the fan cover 52 flows toward the inside in the vehicle width direction as the air flow W, and is sucked into the fan 51. The air flow W sucked into the fan 51 is blown off toward the outside in the radial direction of the fan 51, and flows toward the air passage 54 in the cylinder portion cover 53 through the inside of the fan cover 52. With the air flow W that flows into the air passage 54, the cylinder portion 24 is forcibly cooled by air.

The air flow W also advances between the radial directional rib 77 of the cylinder head 24b and the heat radiation fin 79 of the cylinder block 24a disposed at an uppermost position in the drawing, and flows while being brought into contact with the extending portions 76A, 76B of the gasket 75.

As illustrated in FIG. 5, the air flow W that advances between the plurality of heat radiation ribs 78 is brought into contact with upper surfaces of the extending portions 76A, 76B in the drawing. Accordingly, the extending portions 76A, 76B are cooled by air and hence, the cylinder head 24b is cooled.

Further, the radially directional rib 77 receives air from the fan 51 and hence, the gasket 75 can be cooled from a cylinder head 24b side.

By exposing the extending portions 76A, 76B of the gasket 75 to outside air, a temperature of the combustion chamber 70 can be lowered.

With reference to FIG. 4, the air flow W that flows into the air passage 54 advances also from a cylinder block 24a side. The air flow W advances between the heat radiation fin 79 of the cylinder block 24a on an uppermost position in the drawing and the gasket 75, and is brought into contact with lower surfaces in the drawing of the extending portions 76A, 76B of the gasket 75. Accordingly, the extending portions 76A, 76B are further forcibly cooled by air and hence, the cylinder head 24b is cooled.

By exposing the extending portions 76A, 76B of the gasket 75 to outside air, a temperature of the combustion chamber 70 can be lowered.

In this embodiment, the extending portions 76A, 76B of the gasket 75 and the plurality of heat radiation ribs 78 are brought into contact with each other in the direction of the cylinder axis 24d. Accordingly, the gasket 75 can be cooled by the plurality of heat radiation ribs 78.

The extending portions 76A, 76B of the gasket 75 extend to the outer edge portions 78A of the heat radiation ribs 78. Accordingly, it is possible to allow the gasket 75 to have the largest area while pressing the gasket 75 by the heat radiation ribs 78. The extending portions 76A, 76B of the gasket 75 extend in the direction that traverses the heat radiation ribs 78 and hence, it is possible to make traveling air of the saddle riding vehicle 10 efficiently impinge on the gasket 75.

The extending portions 76A, 76B of the gasket 75 are brought into contact with the heat radiation ribs 78 of the cylinder head 24b on an intake side, and are not brought into contact with heat radiation ribs of the cylinder head 24b on an exhaust side. The exhaust side of the cylinder head 24b is hot and hence, even when the exhaust side of the cylinder head 24b is brought into contact with the heat radiation ribs 78, a cooling effect is low. On the other hand, the intake side of the cylinder head 24b is not hot and hence, a cooling effect can be enhanced.

The cylinder head 24b has the radially directional rib 77 that extends more sideward than the extending portions 76A, 76B of the gasket 75 as viewed in a cylinder axis direction. Accordingly, the cylinder head 24b receives the air flow W from the fan 51 of a forced air cooling type, and can cool the gasket 75 also from a cylinder head 24b side.

In the above-mentioned embodiment, the heat radiation ribs 78 are formed on the cylinder head 24b. However, the present invention is not limited to such a configuration. Heat radiation ribs that extend in the cylinder axis direction may be formed on the cylinder block 24a. In this case, the gasket 75 and the plurality of heat radiation ribs formed on the cylinder block 24a may be brought into contact with each other.

In the above-mentioned embodiment, the description has been made by exemplifying the motorcycle as an example of a saddle riding vehicle. However, the saddle riding vehicle may be a three-wheeled saddle riding vehicle which includes two front wheels or two rear wheels, or a saddle riding vehicle which includes four or more wheels.

Configurations Supported By The Above-Mentioned Embodiment

The above-mentioned embodiment supports the following configurations.

Configuration 1

In the internal combustion engine where the gasket is disposed between the joining surfaces of the cylinder block and the cylinder head, and the heat radiation ribs that extend in the cylinder axis direction are formed on the cylinder block or the cylinder head, the gasket includes: the portion to be sandwiched that is sandwiched between the joining surfaces; and the extending portions protruding toward the outside from the portion to be sandwiched as viewed in the cylinder axis direction.

With such a configuration, by exposing the extending portions of the gasket to outside air, the elevation of a temperature of the combustion chamber can be suppressed.

Configuration 2

The internal combustion engine described in the configuration 1, in which the extending portion of the gasket and the heat radiation ribs are brought into contact with each other in the cylinder axis direction.

With such a configuration, the gasket can be cooled by the heat radiation ribs.

Configuration 3

The internal combustion engine described in the configuration 1 or 2, in which the extending portion of the gasket extends to the outer edge portions of the heat radiation ribs or the area in front of the outer edge portions.

With such a configuration, the gasket is allowed to have the largest area while pressing the gasket by the heat radiation ribs.

Configuration 4

The internal combustion engine described in any one of the configurations 1 to 3, in which the extending portion of the gasket extends in the direction that traverses the heat radiation ribs.

With such a configuration, it is possible to make traveling air of the saddle riding vehicle or air that passes through between the heat radiation ribs efficiently impinge on the gasket.

Configuration 5

The internal combustion engine described in any one of the configurations 1 to 4, in which the extending portion of the gasket is brought into contact with the heat radiation ribs of the cylinder head on the intake side, and the extending portion of the gasket is not brought into contact with the heat radiation ribs of the cylinder head on the exhaust side.

With such a configuration, the exhaust side of the cylinder head is hot and hence, a cooling effect is low. On the other hand, the intake side of the cylinder head is not hot and hence, the cooling effect can be enhanced.

Configuration 6

The internal combustion engine described in any one of the configurations 1 to 5, in which the cylinder head includes the radial directional rib that extends more sideward than the extending portion of the gasket as viewed in the cylinder axis direction.

With such a configuration, since the internal combustion engine has the forced air cooling fan, the radially directional rib receives air from the forced air cooling fan. Accordingly, the gasket can be cooled also from the cylinder head side.

Configuration 7

The internal combustion engine described in any one of the configurations 1 to 6, in which the gasket is made of metal having a higher specific heat than the cylinder block and the cylinder head.

With such a configuration, since the specific heat of the gasket including the extending portion is higher than the specific heat of the cylinder block and the cylinder head and hence, such a configuration contributes to cooling of the cylinder block.

REFERENCE SIGNS LIST

10: saddle riding vehicle
12: power unit
23: crankcase
24: cylinder portion
24a: cylinder block
24b: cylinder head
24c: cylinder head cover
50: air supply device
54: air passage
70: combustion chamber
75: gasket
73, 74: joining surface
76: portion to be sandwiched
76A, 76B: extending portion
77: radially directional rib
78: heat radiation rib

The invention claimed is:

1. An internal combustion engine where a gasket is disposed between joining surfaces of a cylinder block and a cylinder head, and a heat radiation rib that extends in a cylinder axis direction is formed on the cylinder block or the cylinder head, wherein
   the gasket includes:
      a portion to be sandwiched that is sandwiched between the joining surfaces; and
      an extending portion that protrudes toward an outside from the portion to be sandwiched as viewed in the cylinder axis direction, and
   the extending portion of the gasket and the heat radiation rib are brought into contact with each other in the cylinder axis direction.

2. The internal combustion engine according to claim 1, wherein the extending portion of the gasket extends to an outer edge portion of the heat radiation rib or an area in front of the outer edge portion.

3. The internal combustion engine according to claim 1, wherein the extending portion of the gasket extends in a direction that traverses the heat radiation rib.

4. The internal combustion engine according to claim 1, wherein the extending portion of the gasket is brought into contact with the heat radiation rib of the cylinder head on an intake side, and
   the extending portion of the gasket is not brought into contact with the heat radiation rib of the cylinder head on an exhaust side.

5. The internal combustion engine according to claim 1, wherein the cylinder head includes a radial directional rib that extends more sideward than the extending portion of the gasket as viewed in the cylinder axis direction.

6. The internal combustion engine according to claim 1, wherein the gasket is made of metal having a higher specific heat than the cylinder block and the cylinder head.

7. An internal combustion engine where a gasket is disposed between joining surfaces of a cylinder block and a cylinder head, and a heat radiation rib that extends in a cylinder axis direction is formed on the cylinder block or the cylinder head, wherein
   the gasket includes:
      a portion to be sandwiched that is sandwiched between the joining surfaces; and
      an extending portion that protrudes toward an outside from the portion to be sandwiched as viewed in the cylinder axis direction,
   the extending portion of the gasket is brought into contact with the heat radiation rib of the cylinder head on an intake side, and
   the extending portion of the gasket is not brought into contact with the heat radiation rib of the cylinder head on an exhaust side.

8. An internal combustion engine where a gasket is disposed between joining surfaces of a cylinder block and a cylinder head, and a heat radiation rib that extends in a cylinder axis direction is formed on the cylinder block or the cylinder head, wherein
   the gasket includes:
      a portion to be sandwiched that is sandwiched between the joining surfaces; and
      an extending portion that protrudes toward an outside from the portion to be sandwiched as viewed in the cylinder axis direction,
   the cylinder head includes a radial directional rib that extends more sideward than the extending portion of the gasket as viewed in the cylinder axis direction.

* * * * *